United States Patent
Lee et al.

(10) Patent No.: US 7,443,505 B2
(45) Date of Patent: Oct. 28, 2008

(54) OPTICAL ALIGNMENT METHOD AND APPARATUS

(75) Inventors: Jong Jin Lee, Gwangju (KR); Hyun Seo Kang, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 11/635,578

(22) Filed: Dec. 8, 2006

(65) Prior Publication Data
US 2007/0133931 A1 Jun. 14, 2007

(30) Foreign Application Priority Data
Dec. 8, 2005 (KR) .................. 10-2005-0120237
Jul. 4, 2006 (KR) .................. 10-2006-0062679

(51) Int. Cl.
G01B 11/00 (2006.01)
G01B 11/26 (2006.01)
G01N 21/86 (2006.01)
G01V 8/00 (2006.01)
G02B 6/26 (2006.01)
G02B 6/42 (2006.01)

(52) U.S. Cl. .................. 356/399; 356/153; 250/559.3; 385/52; 385/88

(58) Field of Classification Search .................. None
See application file for complete search history.

(56) References Cited

U.S. PATENT DOCUMENTS

| | | | |
|---|---|---|---|
| 4,722,081 A * | 1/1988 | Fujito et al. .................. 398/76 |
| 4,854,667 A | 8/1989 | Ebata et al. |
| 4,926,430 A | 5/1990 | Isono |
| 5,108,167 A | 4/1992 | Kandpal et al. |
| 5,450,508 A * | 9/1995 | Decusatis et al. .............. 385/25 |
| 5,469,257 A * | 11/1995 | Blake et al. .................. 356/464 |
| 6,118,910 A * | 9/2000 | Chang .......................... 385/16 |
| 6,763,153 B2 * | 7/2004 | Bennett ....................... 385/12 |
| 6,945,710 B2 | 9/2005 | Chen et al. |

FOREIGN PATENT DOCUMENTS

| | | |
|---|---|---|
| JP | 2001281506 | 10/2001 |
| KR | 100211943 | 5/1999 |
| KR | 1020000019589 | 4/2000 |

* cited by examiner

*Primary Examiner*—Gregory J Toatley, Jr.
*Assistant Examiner*—Gordon J Stock, Jr.
(74) *Attorney, Agent, or Firm*—Lowe Hauptman Ham & Berner, LLP

(57) ABSTRACT

In disclosed optical alignment method and apparatus thereof, external reflection entering laser diode by feedback from transmission line of low cost bidirectional optical transceiver module without optical isolator for subscribers is reduced so as to reduce RIN considering high optical coupling efficiency. The external reflection is minimized using property that output current increases in proportion to external reflection during optical alignment. For optimal optical alignment, external reflection and RIN are previously measured according to optical alignment position between subassembly and optical fiber. Optimal position is determined by both light output and RIN, and predetermined ratio of the mPD output current of minimum RIN position to that of maximum light output power position.

6 Claims, 10 Drawing Sheets

(a)

(b)

(a)

(b)

OPTICAL ALIGNMENT METHOD AND APPARATUS

RELATED APPLICATION

The present application is based on, and claims priority from, Korean Application Number 2005-120237, filed Dec. 8, 2005, and Korean Application Number 2006-62679, filed Jul. 4, 2006, the disclosure of which is incorporated by reference herein in its entirety.

BACKGROUND OF THE INVENTION

1. Field of the Invention

The present invention relates to an optical bidirectional transceiver for transmitting and receiving an optical signal bidirectionally through a single optical fiber, and more particularly, to an optical alignment method of reducing light input reflected from a certain end point on a transmission line and entering a laser diode to reduce a Relative intensity noise (RIN) generated by the reflected light and to secure optical coupling efficiency at the same time, and an optical alignment apparatus.

2. Description of the Related Art

RIN occurring in an optical transceiver module increases in proportion to the quantity of reflected light input that is reflected from a certain point of an optical transmission line and enters a laser diode. Up to now, the RIN is reduced, as disclosed in U.S. Pat. No. 4,926,430, by an optical isolator provided between the laser diode and the optical fiber to intercept the reflected light input from the optical fiber to the laser diode.

In a case of using the optical isolator, when the quantity of the reflected light entering the laser diode is reduced, RIN is reduced and quality of a signal is improved. However, since the optical isolator is expensive, manufacturing costs of the optical transceiver module increase. Moreover, since the optical isolator is implemented in the form of bulk type, it is difficult to minimize the size of the optical transceiver module.

Thus, it is more difficult to apply the optical isolator to an optical transceiver module for a subscriber network application requiring low costs and small size.

In a case of a bidirectional optical transceiver module for a subscriber network application, the optical alignment is attempted between the optical fiber and the laser diode without the optical isolator. In this case, the optical fiber is aligned with the laser diode to detected the maximum light output (This is a technology commonly accepted in the passive alignment and the active alignment.), and after the optical alignment, the optical fiber is fixed at the aligned position by laser welding, soldering, epoxy, or the like depending on the configuration properties of the module.

FIG. 1 is a block diagram illustrating a conventional optical alignment apparatus for aligning optical axes to an optical subassembly 10 and an optical fiber 20. The conventional optical alignment apparatus 30, in order to focus a light outputted from a focusing lens 12 of the optical subassembly 10 to an input end of the optical fiber 20, measures light power outputted from the optical fiber 20 with an first optical power meter 31 and feeds a measured light output signal to a controller 32. The controller 32 controls an optical aligning device 33 to adjust the position of the optical fiber 20 such that the light output power measured by the optical power meter 31 gets maximal.

As such, the conventional optical alignment apparatus 30 determines the alignment position of the optical fiber 20 by considering only the light output power 11b such that the light output is maximal.

Thus, in the optical transceiver comprising the optical isolator, since the incident quantity of external reflection is small, the optical alignment is carried out only with respect to the maximum light output as described above to achieve the maximum optical coupling efficiency. However, in a configuration coupling the optical fiber 20 with the laser diode 11 without isolator, since a great deal of reflected light enters the laser diode 11, the quality of a signal is deteriorated when the optical alignment is carried out only by taking the maximum output into consideration without the above-mentioned RIN.

In other words, in a case of fixing an optical system by carrying out the optical alignment with respect to the position of the maximum light output, since the quantity of the external reflection entering the laser diode 11 is also maximized, the RIN is also maximized like the experimental result illustrated in FIG. 2.

SUMMARY OF THE INVENTION

Therefore, the present invention has been made in view of the above problems, and it is an object of the present invention to provide an optical alignment method, of a bidirectional optical transmitter for transmitting and receiving an optical signal bidirectionally through a single optical fiber, of reducing RIN generated by reflected light by reducing the reflected light input and of guaranteeing high optical coupling efficiency, and an apparatus for performing the same.

In accordance with an object of the present invention, the above and other objects can be accomplished by the provision of an optical alignment apparatus for carrying out an optical alignment between an optical subassembly and an optical fiber, comprising a laser diode for generating light, a focus lens for focusing the light generated by the laser diode to an input end of the optical fiber, and a monitoring photodiode (mPD) for monitoring a state of light output power from the laser diode, and the optical fiber for a bidirectional optical transceiver module without an optical isolator, the optical alignment apparatus including: a first optical power meter for detecting power of the light outputted from the optical fiber; a current meter for detecting output current of the mPD; a controller for storing information about the relationship between the RIN and the mPD output current, for controlling the optical alignment such that the optical output power detected by the first optical power meter is maximal, and after that, for controlling the optical alignment such that the minimum relative noise occurs referring to the output current of the mPD detected by the current meter and the relationship; and an optical alignment device for moving the optical fiber according to the controller.

The optical alignment apparatus of the present invention further includes an optical splitter for mixing optical beams inputted from first and second terminals and splitting out the mixed optical beams out to third and fourth terminals or for mixing optical beams inputted from the third and fourth terminals and splitting the mixed optical beams out to the first and second terminal, the first terminal being connected to an output end of the optical fiber; a relative intensity noise meter for measuring the RIN connected the third terminal of the optical splitter; a variable optical reflector connected to the fourth terminal of the optical splitter to reflect the light back to the fourth terminal at a predetermined quantity of the reflection; and a second optical power meter connected to the second terminal of the optical splitter to measure power of the reflection reflected by the variable optical reflector and entering the optical subassembly.

Additionally, with the variable optical reflector controlled such that the predetermined quantity of the reflection is maintained referring to the feedback from the second optical power meter, the optical fiber is moved to X and Y direction starting from the maximum output alignment position to scan the RIN with the relative intensity noise meter, and to find out the ratio of the mPD output current detected by the current meter at a minimum RIN position, to mPD output current at the maximum light output power, to set the ratio as a target value of the controller, and the controller controls the optical alignment device such that the first optical power meter measures the maximum light output power with the mPD output current measured by the current meter being stored to the controller, a ratio of current measured at the minimum RIN position, to a current measured at the maximum light output power position, is calculated while the optical fiber is moving, and the ratio from the calculation is taken as the control target value.

In order to accomplish the object of the present invention, the present invention also provides an optical alignment method between a laser diode and an optical fiber in a bidirectional optical transceiver without an optical isolator, including of steps: detecting an optical output power coupled to the optical fiber; adjusting the position of the optical fiber with respect to the laser diode so as to achieve the maximum coupling efficiency; detecting RIN due to reflection entering the laser diode according to the alignment position; and defocusing of the optical fiber such that the detected RIN become minimal by adjusting the alignment position referring to the optimal mPD output current ratio.

Moreover, the optical alignment method further includes measuring output current of the mPD, installed in the optical subassembly, at the minimum RIN, and calculating a ratio of the output current at the minimum RIN alignment position, to the output current at the maximum light output power alignment position and setting the optimal ratio value as the alignment control target, in a bidirectional optical transceiver modules with identical optical specification.

Once the ratio value is set following above process, for the other production of transceiver modules hereafter, the alignment process is carried out by just measuring the mPD output current at the maximum output position and defocusing the optical fiber to the position that predetermined mPD current ratio value comes out. By doing so, the present invention saves the alignment task time that the RIN meter consumes a lot due to digital signal process inside and the cost since manufacturers can carry out alignment process without high cost RIN meter by just taking the optical mPD current ratio value determined in previous step instead of real time RIN measurement during alignment process.

BRIEF DESCRIPTION OF THE DRAWINGS

These and/or other objects and advantages of the present invention will become apparent and more readily appreciated from the following description of the embodiments, taken in conjunction with the accompanying drawings, in which.

DESCRIPTION OF THE PREFERRED EMBODIMENTS

Figure 1:
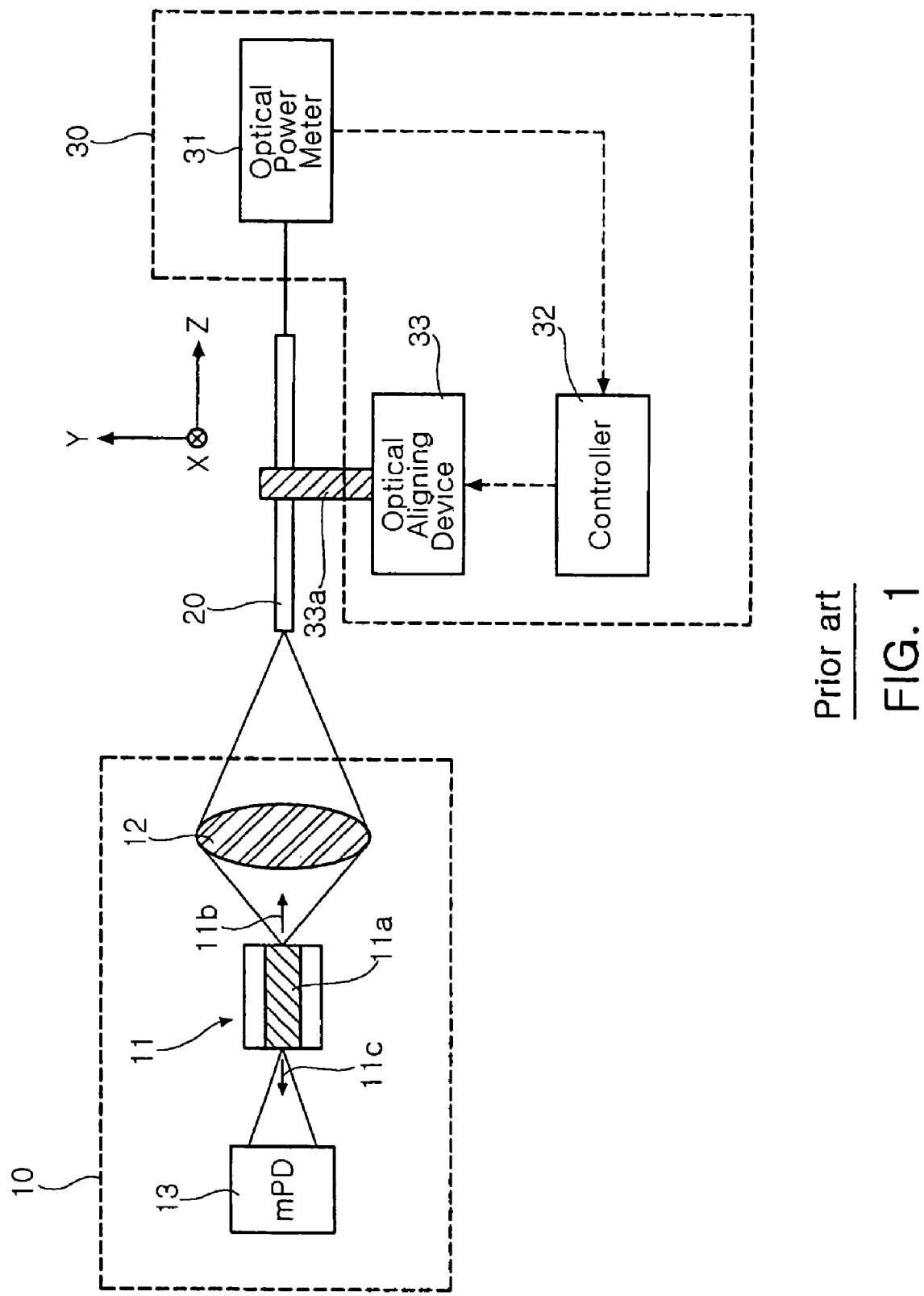
FIG. 1 is a block diagram illustrating a conventional optical aligning apparatus.

Hereinafter, the present invention will be described in detail with reference to the accompanying drawings as follows. It is noticed that like reference numerals designate like or corresponding components throughout the several drawings. Moreover, in the following description of the present invention, if the detailed description of the already known structure and operation may confuse the subject matter of the present invention, the detailed description thereof will be omitted.

The present invention is different from the conventional method and apparatus and is intended to carrying out an optimal optical alignment by taking the maximum light output and the minimum RIN into consideration. In an optical transceiver module without an isolator, at an optical alignment position indicating the maximal light output, where the RIN is also maximal by experiment. The optical alignment is carried out based on the maximum output by adjusting a focus of an optical axis, and then the RIN is reduced by defocusing, so that a signal-to-noise ratio (SNR) due to the light output and reflection is ultimately improved.

Figure 2:
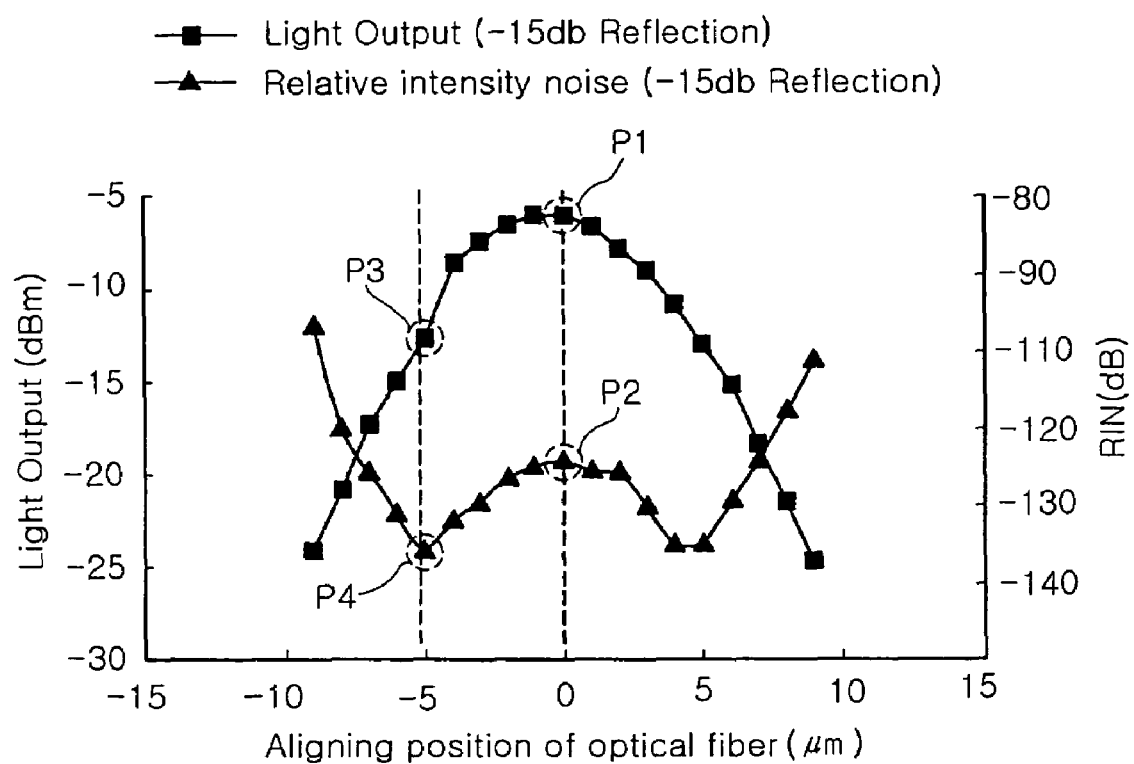
FIG. 2 is a graph illustrating result of experiments for measuring light output power and RIN according to alignment position of a laser diode and an optical fiber when external reflection of −15 dB enters.

FIG. 2 shows results of experiments for light output power and RIN according to aligning positions of an optical transceiver module without an optical isolator carried out by an inventor(s) of the present invention. The variations of the light output and the RIN occur when the optical alignment position on the X-axis perpendicular to a propagation axis (Z-axis) is changed with the magnitude of the external reflection entering the laser diode set to about −15 dB.

By referring to FIG. 2, within a region where the optical coupling is meaningful, it can be learned that the RIN P2 is maximal when there is the maximum output power P1. Additionally, the RIN is minimal at a position P3 where the defocusing is occurred by a predetermined distance (about 5 μm) from an optical alignment position where the maximum light output power P1 occurs. In addition, when the defocusing is further occurred, the loss of the optical coupling is generated and the light output power is too small, the optical coupling is meaningless. In other words, only RIN within a predetermined region (about 5 μm) with respect to the optical alignment position where the maximum light output power occurs is available.

Thus, after the optical axis is aligned such that the maximum light output power occurs like the present invention, the defocusing is carried out such that the RIN is minimized about the position so that the available light output power can be obtained and the RIN can be reduced.

As such, in order to take the light output power and the RIN into consideration simultaneously, the light output power of the optical fiber and the reflection entering a laser diode must be measured at high speed and real time during optical alignment. However, since a measuring apparatus for measuring the RIN is expensive and requires a long time for measuring the RIN because of the property of sweeping at respective alignment positions with respect to frequency range of few MHz to few GHz, the apparatus is not suitable for the low cost and high speed real-time processing compatible with mass production.

Figure 3:
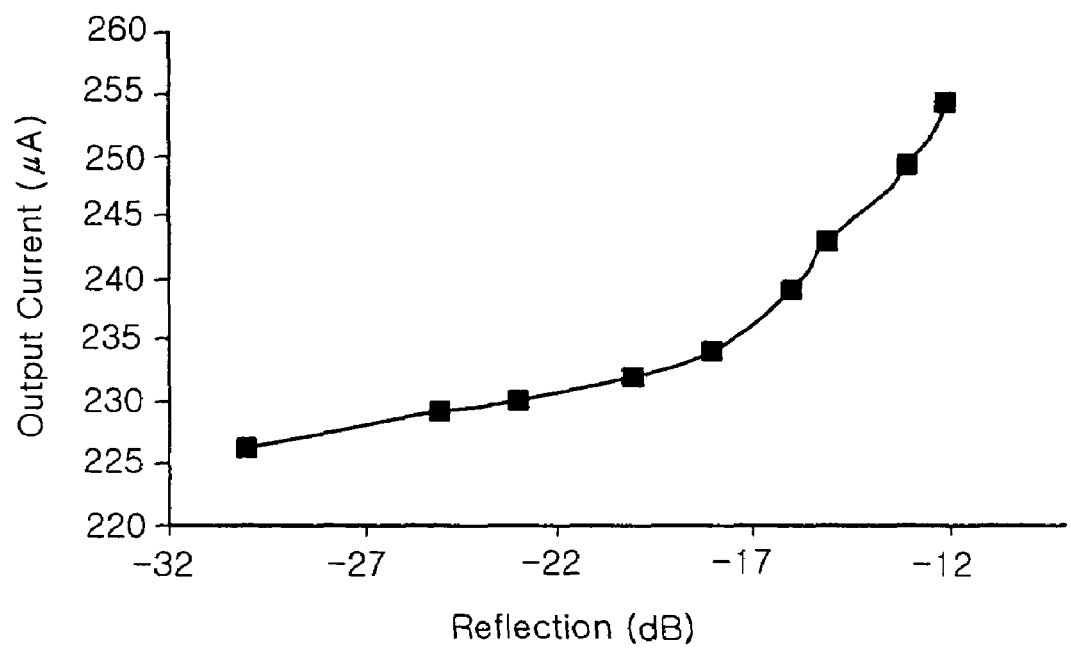
FIG. 3 is a graph illustrating results of experiments for measuring variation of output current of a mPD according to the quantity of external reflection entering the laser diode.

In the present invention, in order to save time and cost for the measurement of the RIN, experiments have been carried out in advance to confirm that, when light reflected from some point of the transmission line and enters an active area 11a of a laser diode, the reflection light passes through the laser diode 11 and increase the quantity of the incident light of a mPD 13 and to increase the output current of the mPD 13. This can be proved by experimentally by measuring the output current of the mPD 13 with alignment position fixed and the quantity of the reflection changed as shown FIG. 3.

Thus, the present invention proposes to calculate the RIN using output current of the mPD 13 by considering the fact that the RIN is in proportion to the quantity of the reflection entering the laser diode 11, and variation of output current of the mPD 13, installed in an optical subassembly 10 to monitor the light output power 11b from a back facet 11c of the laser diode 11, is in proportion to the quantity of the reflection entering the active area 11a of the laser diode 11, and for the other laser diodes, designed and manufactured to an identical optical specification, shows identical RIN characteristics with respect to identical quantity of the reflection.

Figure 8:
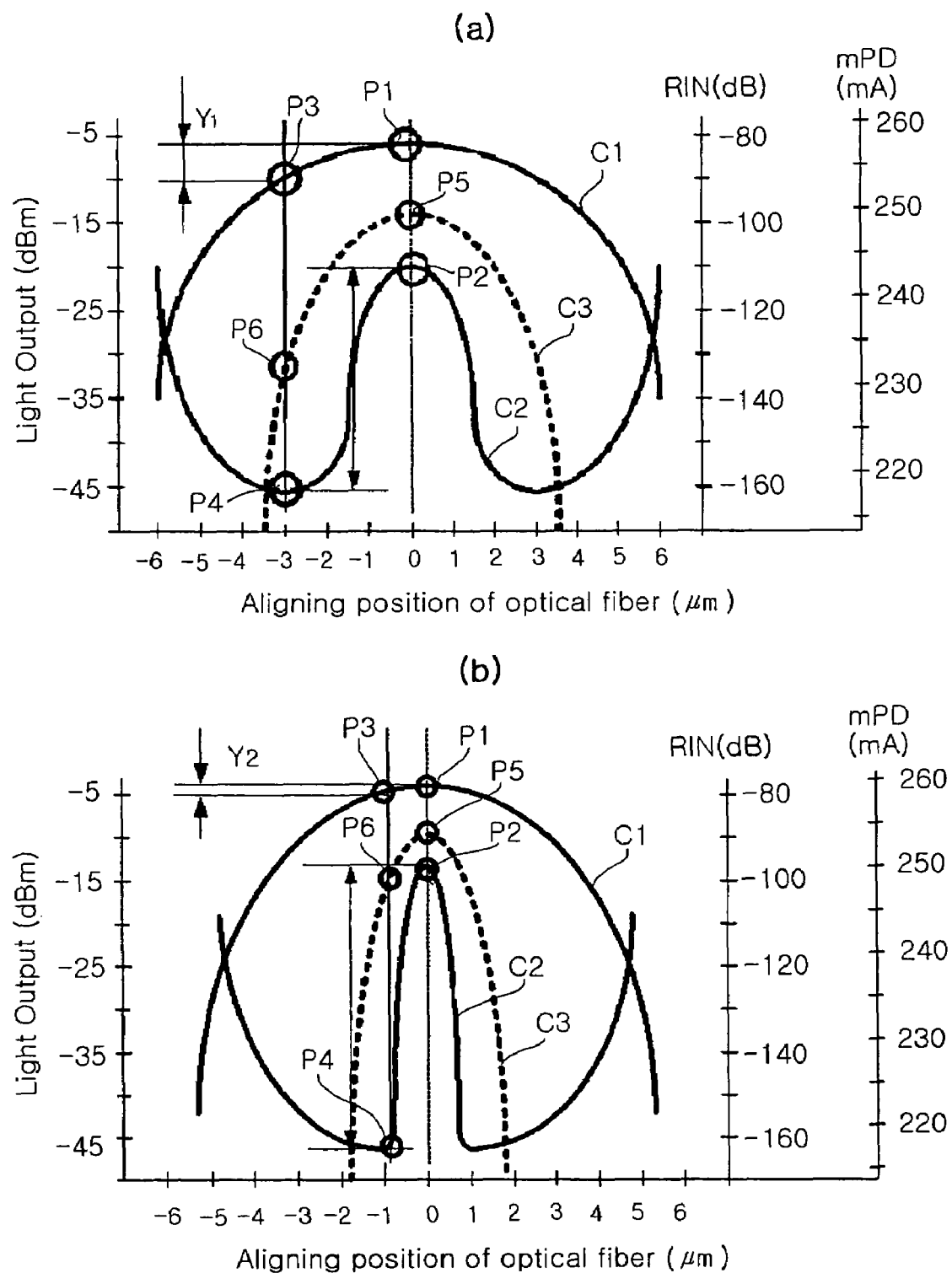
FIGS. 8a and 8b are graphs respectively illustrating curves of the output power, the RIN, and output current of a mPD according to the optical alignment positions in the optical transmitter in FIGS. 5a and 5b.

In more detail, after measuring the light output power, the RIN, and the output current of a mPD according to the optical alignment position while maintaining the quantity of the reflection constant, a alignment control target value is set to a ratio of the mPD output current P6 (See FIG. 8) where the minimum RIN appears to the mPD output P5 (See FIG. 8) at the maximum light output power, so that only with the mPD output current the optical alignment can be optimized to minimize the RIN and maximize the light output power without measuring real time RIN for the production of other optical subassemblies having the identical optical specification after that. At that time, the quantity of the reflection, provided to measure the RIN and the output current of the mPD, is determined by the optical reflection specification of a network system the transceiver might be applied.

Figure 4:
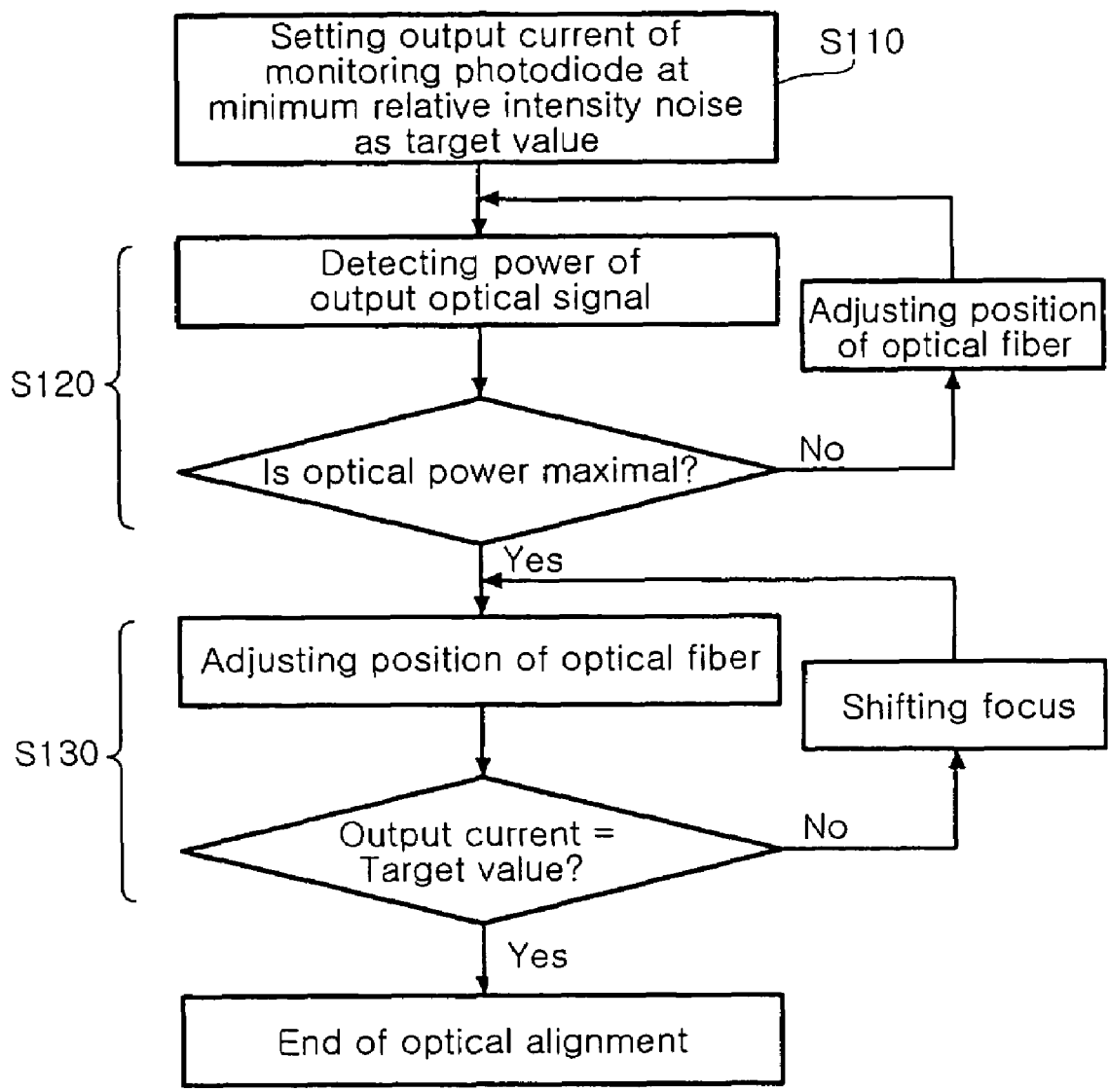
FIG. 4 is a flowchart illustrating an optical alignment method of a low noise bidirectional optical transceiver according to an embodiment of the present invention.
Figure 5:
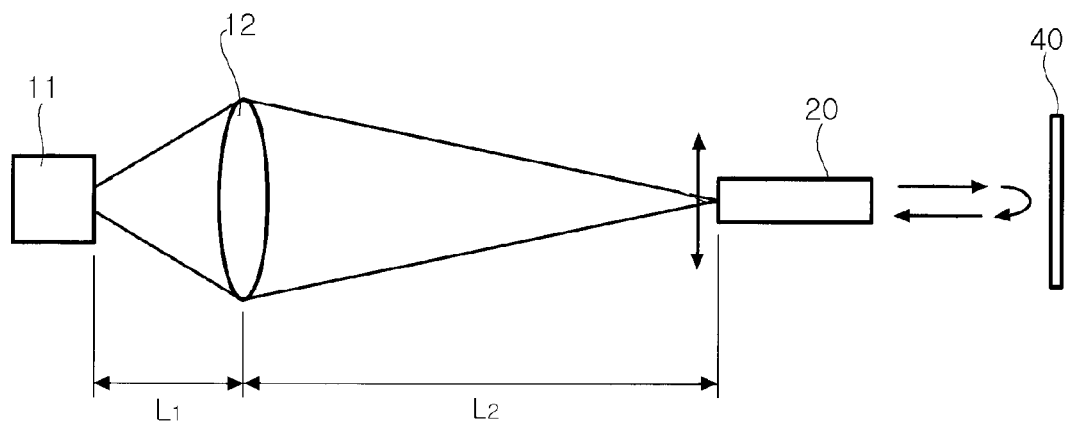
FIG. 5a is a conceptual view of a conventional optical transceiver module having a focal length between a focusing lens and an optical fiber longer than over ten times a distance between a laser diode and the focusing lens.
FIG. 5b is a conceptual view of an optical transceiver module designed to actually have a distance between a focusing lens and an optical fiber shorter than three times a distance between a laser diode and the focusing lens in order to effectively achieve aspects of the present invention.
Figure 5:
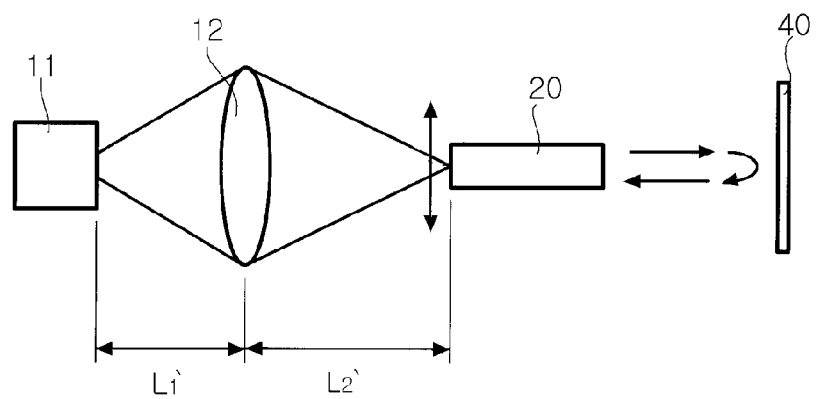
Figure 6:
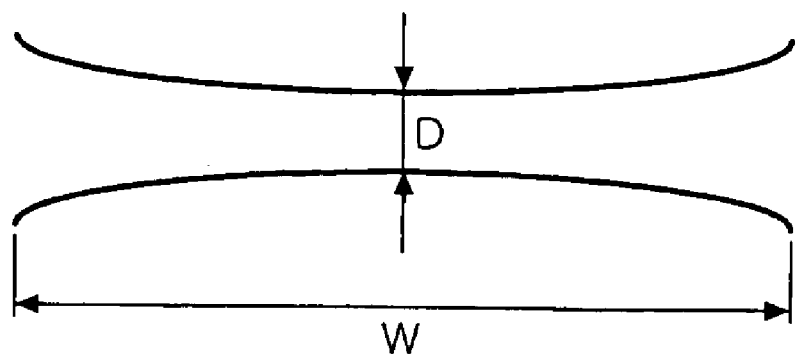
FIGS. 6a and 6b are schematic views illustrating beam spot size D and depth of focus W at the focal point in the respective optical transceiver modules in FIGS. 5a and 5b.
Figure 6:
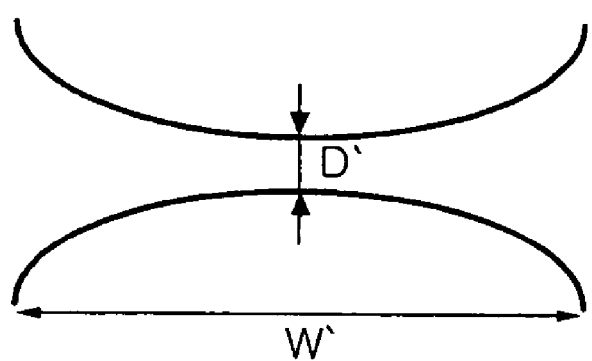
Figure 7:
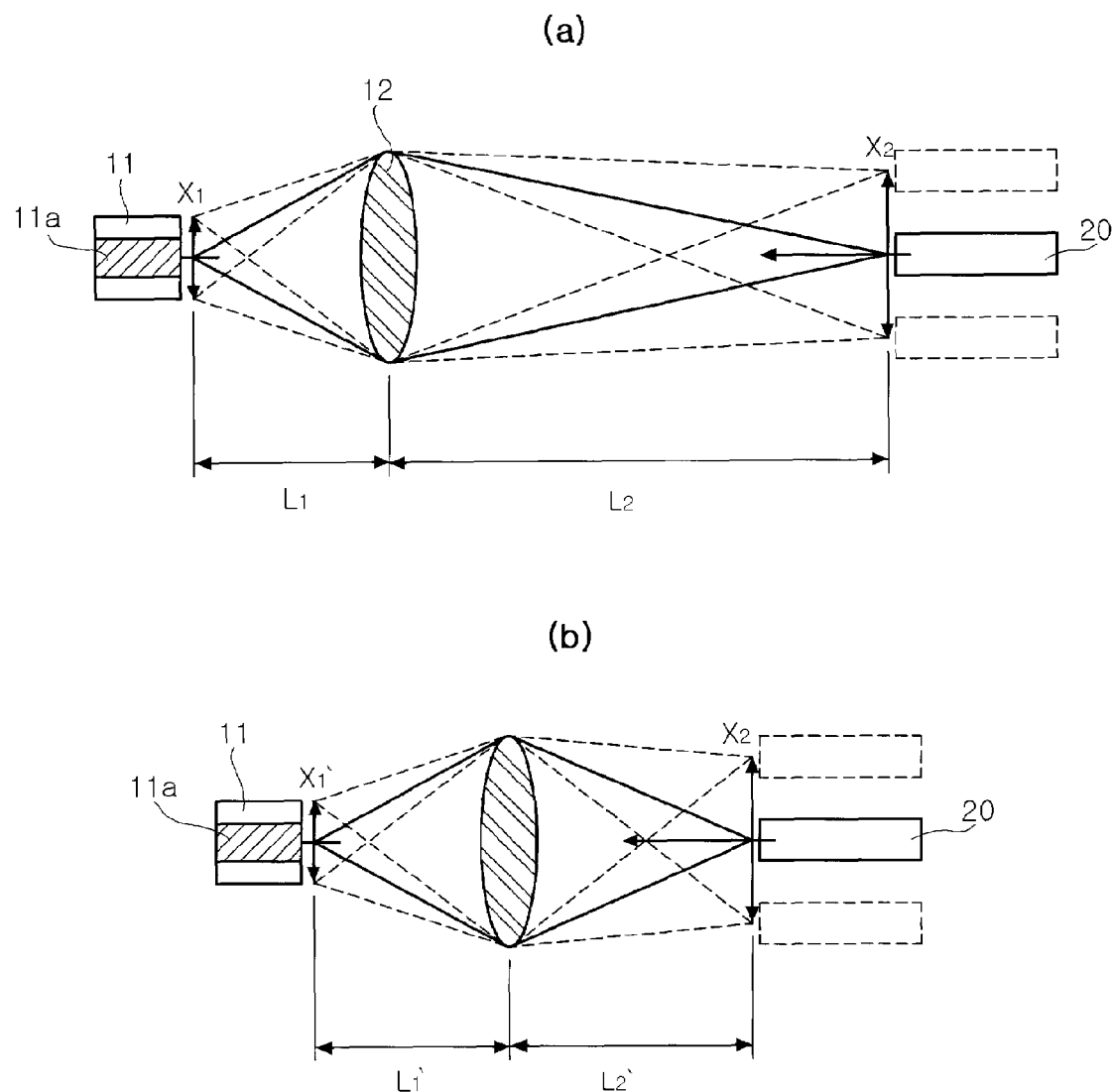
FIGS. 7a and 7b are schematic views illustrating an optical coupling of the external reflection according to the variations of alignment positions of the optical fiber to an active area of the laser diode in the optical transceiver modules in FIGS. 5a and 5b.

FIG. 4 is a flowchart illustrating an optical alignment method according to an embodiment of the present invention as described above.

As shown in FIG. 4, when manufacturing a bidirectional optical transceiver module by aligning an optical subassembly to an optical fiber, as an early process of performing the optical alignment for an optical subassembly, including a laser diode, a focusing lens, and a mPD, a target value is set, to a ratio of mPD output current P6 at the minimum RIN occurs, to mPD output current P5 at the maximum light output power (S110).

In more detail, when a predetermined quantity of the reflection is applied to the optical subassembly through the optical fiber, the RIN, generated from the laser diode comes out through the optical fiber, is measured, and the mPD output current of the optical subassembly is measered. After that, a ratio of the output current, at a place where the minimum RIN is detected from the measurement to the mPD output current P5, at the maximum light output power, is set to the target value. After that, with respect to identical other optical subassemblies, the optical alignment is carried out based on the target ratio value as follows.

Firstly, during the adjustment of an optical alignment position between a corresponding optical subassembly and the optical fiber, the optical alignment is carried out such that the quantity of light outputted from the optical fiber is maximized (S120).

Next, the output current, outputted from the mPD of the corresponding optical subassembly, is scanned, and the optical subassembly and the optical fiber are defocused, such that the predetermined target ratio value is satisfied (S130).

When the optical alignment is carried out as described above, in an optical transceiver module without an isolator, the optimal optical alignment can be carried out by considering the light output power and RIN and as a result, a low intensity noise bidirectional optical transceiver module can be achieved with low costs.

However, as described above, in a case of performing the defocusing such that the minimum RIN P4 appears at the maximum light output power P1, in comparison to the maximum light output power, there is some loss. For example, from the experimental result in FIG. 2, it can be understood that there is about 5 dB, of an optical loss.

The loss of light output power due to the defocusing to a position of the minimum RIN can be saved by designing the optical subassembly to have high sensitivity with respect to the RIN, whereby higher optical coupling efficiency can be achieved even with defocusing.

In more detail for instances, if the specification of the focusing lens is modified such that a focal length from the focusing lens to the optical fiber is less than about three times a focal length from the laser diode to the focusing lens, the alignment position sensitivity of the RIN can be increased. The sensitivity to the RIN represents a variation of the RIN to an identical defocused distance, and as the sensitivity is high, it is possible to obtain the minimum RIN with a small amount of the defocusing by reducing the reflection recoupling to the laser diode.

The relationship between optical specification of the focusing lens, the sensitivity to the RIN according to the optical alignment position, and the reduction of the optical loss will be more easily understood by the following description with reference to FIGS. 5 to 8.

FIGS. 5a and 5b show two optical systems respectively having a different distance between the laser diode 11 and the focusing lens 12 and a distance between the focusing lens 12 and the optical fiber 20, in order to compare the sensitivities to the RIN according to the optical alignment positions determined by the optical specifications of the laser diode 11, the focusing lens 12, and the optical fiber 20.

FIG. 5a shows a case that the focal length L2 between the focusing lens 12 and the optical fiber 20 is longer than ten times of the focal length L1 between the laser diode 11 and the focusing lens 12, and FIG. 5b shows a case that the focal length L2' between the focusing lens 12 and the optical fiber 20 is less than three times of the focal length L1' between the laser diode 11 and the focusing lens 12. In order to compare the sensitivities to the RIN according to the quantity of the reflection input, varied by the amount of defocusing, in the respective optical systems, a variable reflector 40 is installed at the output end of the optical fiber 20 to provide the reflection causing the RIN.

As described above, when the focal lengths between the laser diode 11, the focusing lens 12, and the optical fiber 20 are changed, the depth of focus and the beam spot size of the light focused to the optical fiber 20 are varied.

FIGS. 6a and 6b illustrate beam spot size and depths of focus measured in the two optical systems. FIG. 6a illustrates a beam spot size D and depth of focus W at a focal point that appear in the optical system having the optical specification in FIG. 5a, and FIG. 6b illustrates a beam spot size D' and depth of focus W' at a focal point that appear in the alignment in FIG. 5b. When comparing the optical systems with each other, it can be learned that the beam spot size and the depth of focus in the optical system of FIG. 6b are remarkably smaller than those in the optical system of FIG. 6a. In other words, it can be also learned that a beam spot size and are reduced as the distance between the focusing lens 12 and the optical fiber 20 is decreased.

Additionally, FIGS. 7a and 7b illustrate variations of the defocused length of the reflection, focused and entering the active area 11a of the laser diode 11, with the defocusing of the optical fiber 20 toward the X-axis perpendicular to the beam propagation axis as shown in FIGS. 5a and 5b. In the optical system of FIG. 7a, in a case of elongating the distance L2 between the focusing lens 12 and the optical fiber 20 like the conventional optical system, when the optical fiber 20 moves by X2 of a distance in the X-direction, the defocusing distance becomes X1 within the active area 11a of the laser diode 11. On the other hand, in the optical system of FIG. 7b, in a case of shortening the distance L2' between the focusing lens 12 and the optical fiber 20 replacing the focusing lens, when the optical fiber 20 moves by the distance X2 in the X-axis like the previous case, the defocusing distance X1' within the active area 11a of the laser diode 11 is theoretically much greater than X1, that is, X1'>>X1.

Here, that the defocusing distance X1' of the reflection within the active area of the laser diode 11 is much greater than the displacement X2 of the identical optical fiber 20, means that the incident quantity of the external reflection sensitively varies with respect to the position of the optical fiber 20, and it means that the incident quantity of the reflection can be remarkably reduced even when the optical fiber 20 moves a much shorter distance from the maximum light output power position. In other words, the loss of the light output power is small and the RIN can be significantly reduced even with small defocusing.

As described above, when the variation of the RIN to the alignment position of the optical fiber is increased, since the defocusing distance of the optical fiber 20, required to reduce same RIN, is relatively small, the loss of the optical coupling due to the defocusing of the optical fiber 20 can be reduced, whereby the optimal optical coupling can be achieved to reduce the loss of the light output power and the RIN.

As described above, FIGS. 8a and 8b show the estimated relation of the light output power, the RIN, and the variation of the output current of the mPD according to the optical alignment position, when the ratio of the distance between the laser diode 11 and the focusing lens 12 to the distance between the focusing lens 12 and the optical fiber 20 is about 1:12 and 1:3.

In graphs illustrated in FIGS. 8a and 8b, C1 is a graph illustrating variation of light output power according the optical alignment position, C2 is a graph illustrating the quantity of the RIN according to the optical alignment position, C3 is a graph illustrating the output current of the mPD mPD according to the optical alignment position. It is noted that two of the results in the drawings represent a maximum RIN P2 at a optical alignment position P1 where the maximum light output power appears and a optical alignment position P3 where a minimum RIN P4 appears.

As shown in FIG. 8a and FIG. 8b, a distance between the optical alignment position of P3 and the optical alignment position P1 is much shorter in FIG. 8b than in FIG. 8a. Therefore, a loss Y1 of the light output power in FIG. 8a, is also much smaller than a loss Y2 of the light output power in FIG. 8b.

In other words, in the present invention, it is noted that the loss of the light output power and the RIN can be minimized by a small defocusing with which the maximum light output power occurs, whereby the optical specification of the focusing lens 12 is changed such that the ratios of the distances L1 and L1', from the laser diode 11 to the focusing lens 12, to the distances L2 and L2', from the focusing lens 12 to the optical fiber 20.

Figure 9:
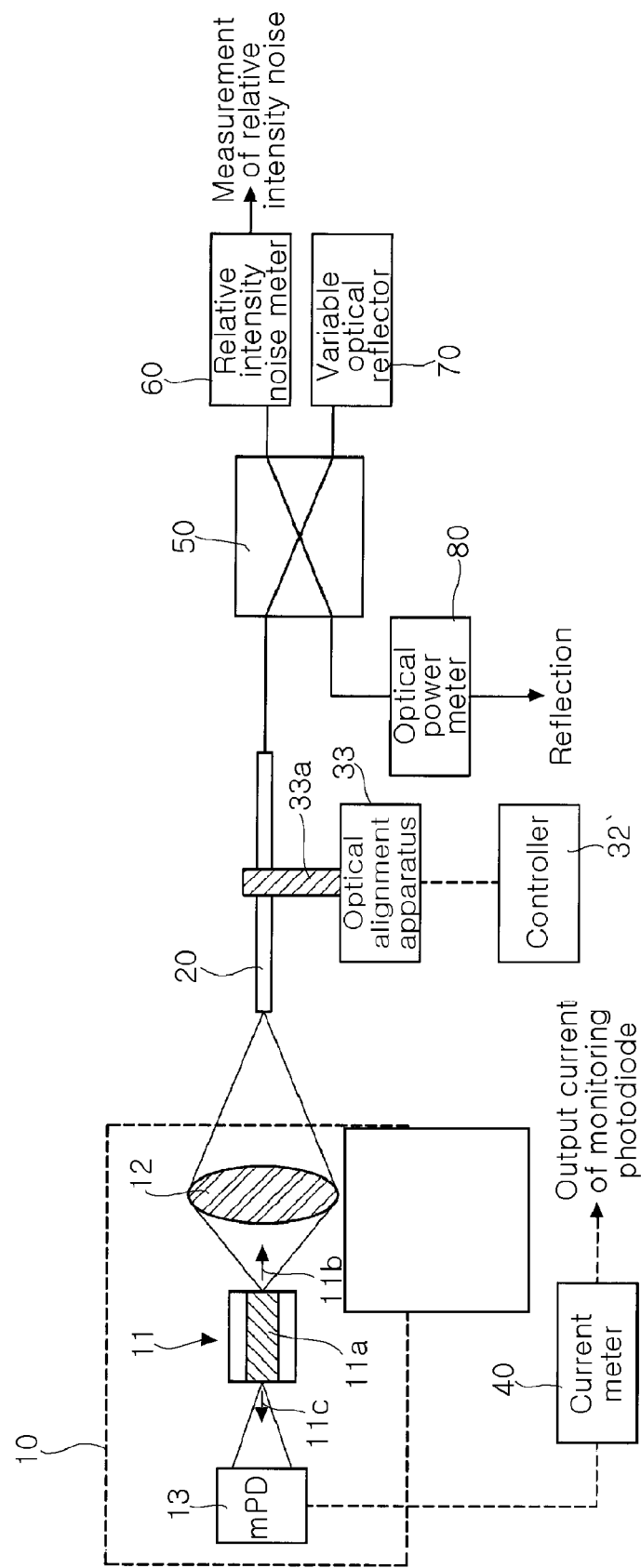
FIG. 9 is a block diagram illustrating an apparatus for measuring RIN according to the external reflection and output current of the mPD at the same moment in order to determine an optimal optical alignment position according to the present invention.
Figure 10:
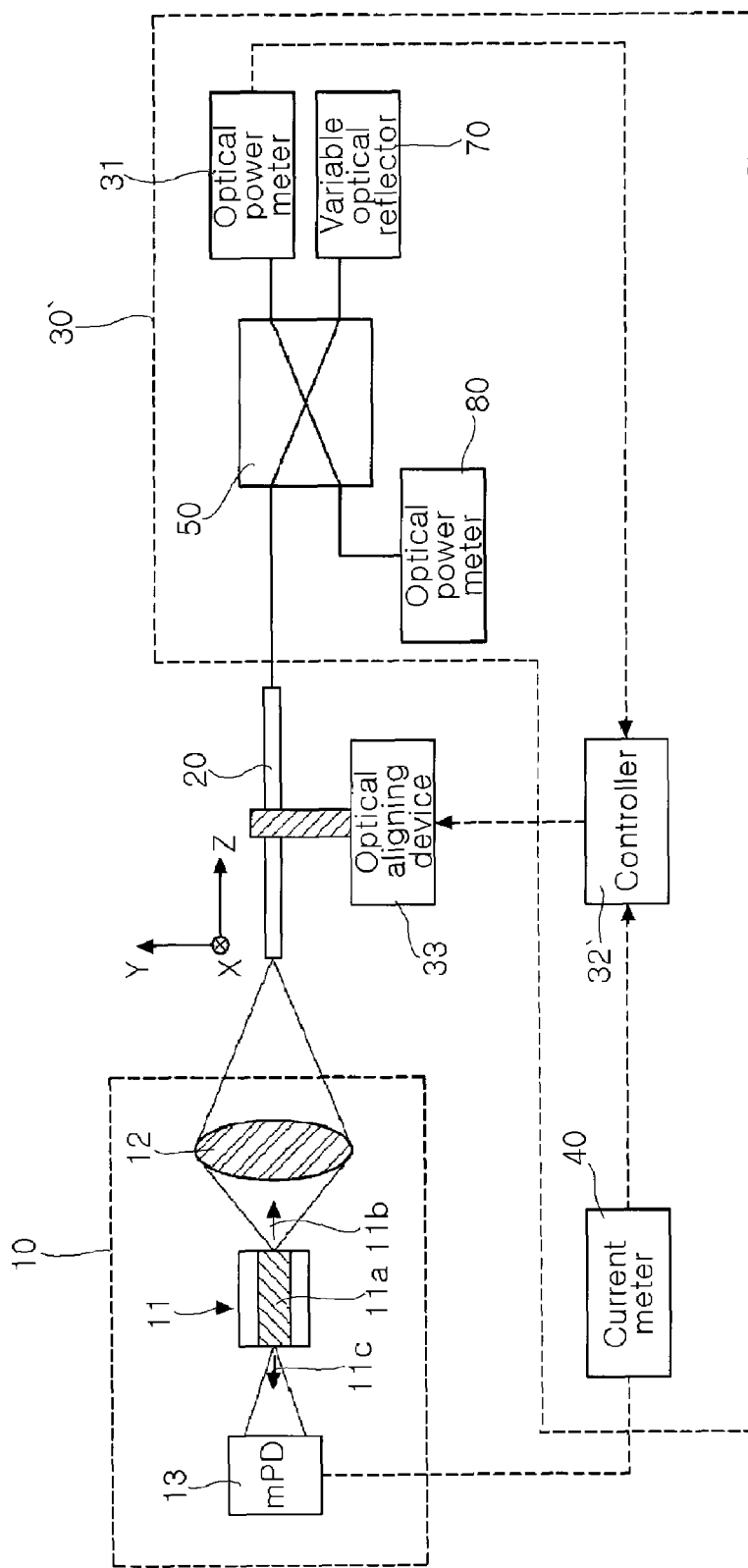
FIG. 10 is a block diagram illustrating an apparatus for performing the optimal optical alignment using only the output current of the mPD during mass production according to the embodiment of the present invention, which is final destiny of this invention.

FIGS. 9 and 10 are block diagrams illustrating a configuration of an optical alignment apparatus for performing the optical alignment method described above.

FIG. 9 illustrates an optical alignment apparatus for measuring a target value of monitoring output current corresponding to the minimum RIN for the optical alignment according to the embodiment of the present invention. The optical alignment apparatus includes a current meter 40 for detecting output current of the mPD 13 provided in the optical subassembly 10, a 2*2 bidirectional optical splitter 50, whose first terminal is connected to the output end of the optical fiber 20, for mixing and splitting light entering through first and second terminals, to output the light through third and fourth terminals, or for mixing and splitting light entering through the third and fourth terminals, to output the light through the first and second terminals, a relative intensity noise meter 60 connected to the third terminal of the optical splitter 50 to measure the RIN contained in the optical output signal, a variable optical reflector 70 connected to the fourth terminal of the optical splitter 50 to reflect a predetermined amount of the light output power to the optical fiber 20, and a second optical power meter 80 connected to the second terminal to measure the quantity of the reflection reflected by the variable optical reflector 70.

Additionally, like the conventional optical alignment apparatus, the optical alignment apparatus according to the embodiment of the present invention further includes a controller 32' for moving the optical fiber 20 and the optical alignment device 33. The optical alignment device 33 includes an optical fiber ferrule fixing frame 33a, and adjusts the optical fiber ferrule fixing frame 33a to change the position of the optical fiber according to the control of the controller 32'.

The optical subassembly 10 includes the laser diode 11 for generating a light, the focusing lens 12 for focusing the light outputted from the laser diode 11 to the optical fiber 20, and the mPD 13 for converting the light outputted from the back facet of the laser diode 11 into an electric signal to monitor the light output state of the laser diode 11, but does not include the isolator.

In the above structure, when the reflection of the variable optical reflector 70 is adjusted such that the quantity of the reflection measured by the second optical power meter 80 is constant, the controller 32' and the optical alignment device 33 are driven to adjust the position of the optical fiber 20 such that the relative intensity noise meter measures the RIN through the optical fiber 20 and the current meter 40 measures the output current of the mPD 13 at this alignment position.

By doing so, after measuring the RIN of the optical fiber 20 and the mPD output current according to every optical alignment position, the measurement results are compared to determine the optical alignment position where the minimum RIN appears, and at this position, the mPD output current is used to calculate a ratio with the maximum output current, to set a target value of the position alignment by controller 32'. In other words, the controller 32' has a ratio of a mPD output current at the minimum RIN position, to the mPD output current at the maximum light output power, as the target value, different from the case of the conventional alignment method.

Due to the apparatus, the mPD output current, corresponding to the minimum RIN according to the respective optical specifications, is obtained so that adequate target value can be set.

After that, the minimum RIN is not individually measured with respect to all optical subassemblies 10 having identical optical specification, but only the output current of the mPD 13 is used to perform the optical alignment, to have the minimum RIN. The optical alignment is carried out by using only the mPD output current without an expensive relative intensity noise meter, so that the optical alignment can be carried out to minimize the RIN, the optical alignment can be more rapidly carried out, and prices of the optical alignment apparatus and the optical transceiver module can be reduced as a result.

FIG. 10 illustrates an optical alignment apparatus for carrying out the optical alignment, between the optical subassembly 10, and the optical fiber 20, having an identical optical specification, after setting the target value as described above.

The optical alignment apparatus 30' according to the embodiment of the present invention is an apparatus for adjusting the position of the optical fiber 20 such that the optimal optical alignment is carried out based on the maximum light output power and the minimum RIN, and includes an first optical power meter 31, connected to an output end of the optical fiber 20 to measure the variation of the light output power, to measure optical power and output the measured optical power in the form of an electric signal, a current meter 40 for measuring output current of the mPD 13 of the optical subassembly 10, a controller 32' for controlling the optical alignment device 33 such that the light output power measured by the first optical power meter 31 is maximal and for defocusing of the optical fiber 20 such that the output current of the mPD 13, measured by the current meter 40, corresponds to the previously set target value, and the optical alignment device 33 for adjusting the position of the optical fiber 20 according to the control of the controller 32'.

The optical alignment apparatus according to the present invention, as shown in FIG. 9, may be implemented by replacing the relative intensity noise meter 60 by the first optical power meter 31. In other words, in a case of firstly carrying out the optical alignment of an optical subassembly with different optical specifications, the optical alignment apparatus in FIG. 9 sets the target value of the mPD output current such that it corresponds to the minimum RIN, and after that, the relative intensity noise meter 60 is replaced by the first optical power meter 31 as shown in FIG. 10 to perform the optical alignment at high speed.

In the optical aligning apparatus, in order for the optimal optical alignment, by considering the light output power and the RIN, the controller 32' measures the optical output power outputted from optical fiber 20 using the first optical power meter 31 and aligns the optical subassembly 10 with the optical fiber 20 to obtain the maximum optical output power. After that, the output current of the mPD 13, measured by the current meter 40, is compared with the target value and the optical fiber 20 is defocused such that the predetermined mPD current ratio satisfies the target value.

As described above, the optical alignment apparatus of the present invention can perform the optimal optical alignment, considering the light output power and the RIN, without an expensive and low speed RIN measuring device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

As described above, according to the optical alignment apparatus of the present invention, the optical alignment is carried out, such that the external reflection of low cost bidirectional optical transceiver module, without the optical isolator, is reduced so as to reduce the RIN. Thus, low price and improved performance of the bidirectional optical transceiver module can be achieved and the demand for small size optical transceiver module can be satisfied.

In addition, the optical splitter, the optical power meter, the variable optical reflector, and the current meter are added to an existing optical alignment apparatus so that the existing system and process can be applied without significant change.

What is claimed is:

1. An optical alignment apparatus for carrying out an optical alignment between an optical subassembly, comprising
   a laser diode for generating light, a focusing lens for focusing the light generated by the laser diode to an input end of an optical fiber, and
   a monitoring photodiode (mPD) for monitoring a state of light output power from the laser diode, and the optical fiber for a bidirectional optical transceiver module without an optical isolator, the optical aligning apparatus comprising:
   a first optical power meter for detecting power of the light outputted from the optical fiber;
   a current meter for detecting output current of the mPD;
   a relative intensity noise meter for measuring a RIN(Relative intensity noise) of the light outputted from the optical fiber;
   a controller for adjusting a position of the optical fiber such that the detected power has a maximum value, defocusing the optical fiber such that the detected RIN has a minimal value, obtaining, as a target value, a ratio of the detected output current at the maximum output power to the detected output current at the minimum RIN and controlling the optical alignment based on the target value;
   an optical alignment device for moving the optical fiber according to command of the controller;
   an optical splitter for mixing optical signals inputted from first and second terminals and splitting the mixed optical signals to third and fourth terminals or for mixing optical signals inputted from the third and fourth terminals and splitting the mixed optical signals to the first and second terminal, the first terminal being connected to an output end of the optical fiber;

a variable optical reflector connected to the fourth terminal of the optical splitter to reflect the light back to the fourth terminal at a predetermined quantity of the reflection; and a second optical power meter connected to the second terminal of the optical splitter to measure power of the reflection reflected by the variable optical reflector and entering the optical subassembly.

2. The optical alignment apparatus according to claim 1, wherein, with the variable optical reflector controlled such that the predetermined quantity of the reflection is maintained being detected by the second optical power meter, the optical fiber is moved to scan the RIN with the relative intensity noise meter, and to find out the ratio of the mPD output current detected by the current meter at a minimum RIN position to the mPD output current at the maximum light output power to set the ratio as the target value of the controller.

3. The optical alignment apparatus according to claim 2, wherein the controller controls the first optical power meter to measure the maximum light output power, stores the mPD output current measured by the current meter at the maximum light output power, calculates a ratio of a present output current to the stored current value measured at the maximum light output power while moving the optical fiber; and controls the optical alignment device so that the calculation becomes the target value.

4. An optical alignment method between a laser diode and an optical fiber in a bidirectional optical transceiver without an optical isolator, comprising:

detecting power of an optical signal generated by the laser diode and outputted through the optical fiber;

adjusting the position of the optical fiber with respect to the laser diode based on the detected power so as to generate a maximum power;

detecting RIN due to reflection entering the laser diode when the maximum power is generated by the adjustment;

defocusing the optical fiber such that the detected RIN is minimal;

obtaining, as a target value, a ratio of an mPD output current at the minimum RIN position to the mPD output current at the maximum light output power; and aligning the the optical fiber based on the target value.

5. The optical alignment method according to claim 4, further comprising measuring output current of the mPD, installed in an optical subassembly, at the minimum RIN, and calculating a ratio of the output current at the RIN alignment position, to the output current at the maximum light output power alignment position and setting the ratio value as an alignment control target in a next production of a bidirectional optical transceiver module with identical optical design specification.

6. The optical alignment method according to claim 5, wherein, in the detecting the RIN, the mPD output current of the optical subassembly is measured, and in defocusing the optical fiber, the optical fiber is moved such that the ratio of the mPD output current at the minimum RIN to the output current at the maximum light output power becomes the alignment control target value.

* * * * *